US009333791B2

(12) United States Patent
Kaneuchi et al.

(10) Patent No.: US 9,333,791 B2
(45) Date of Patent: May 10, 2016

(54) DECORATIVE FILM AND MOLDED PRODUCT INCLUDING THE SAME

(71) Applicant: PANASONIC CORPORATION, Osaka (JP)

(72) Inventors: Kazuhiko Kaneuchi, Osaka (JP); Gakuei Shibata, Osaka (JP); Ryozo Fukuzaki, Osaka (JP); Hideaki Nakagawa, Osaka (JP); Yuuki Sugino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/467,103

(22) Filed: Aug. 25, 2014

(65) Prior Publication Data

US 2015/0064371 A1   Mar. 5, 2015

(30) Foreign Application Priority Data

Sep. 5, 2013  (JP) ................................. 2013-183553

(51) Int. Cl.
| | |
|---|---|
| *B41M 5/50* | (2006.01) |
| *B41M 5/52* | (2006.01) |
| *B32B 27/06* | (2006.01) |
| *B29C 45/14* | (2006.01) |
| *B41M 7/00* | (2006.01) |

(52) U.S. Cl.
CPC ........ *B41M 5/5218* (2013.01); *B29C 45/14811* (2013.01); *B29C 45/14827* (2013.01); *B32B 27/06* (2013.01); *B41M 5/506* (2013.01); *B41M 5/5254* (2013.01); *B41M 5/5263* (2013.01); *B41M 7/0045* (2013.01); *B29C 45/14688* (2013.01); *B29C 2045/14704* (2013.01); *B29K 2995/002* (2013.01); *B29K 2995/0031* (2013.01); *B32B 2307/402* (2013.01); *B32B 2307/748* (2013.01); *B32B 2457/00* (2013.01);

(Continued)

(58) Field of Classification Search
CPC ........ B41M 5/50; B41M 5/5066; B41M 5/52; B41M 5/5209; B41M 5/5218; B41M 2205/10; B41M 5/506; B29C 45/14688; B29C 45/148112; B29C 45/14727; B29C 45/14811; B29C 45/14827; B32B 27/06; B32B 2307/402; B32B 2307/748; B32B 2457/00
USPC .......... 428/32, 12, 32.24, 32.25, 32.34, 32.12
See application file for complete search history.

(56) References Cited

U.S. PATENT DOCUMENTS

| | | | |
|---|---|---|---|
| 6,698,880 B1 | 3/2004 | Campbell et al. | |
| 7,879,416 B2 * | 2/2011 | Hashimoto | ............ B41J 2/0057 106/31.13 |

(Continued)

FOREIGN PATENT DOCUMENTS

| | | | | |
|---|---|---|---|---|
| CN | 101249768 | | 8/2008 | |
| JP | 2002-321443 | * | 11/2002 | ............. B41M 5/506 |

(Continued)

OTHER PUBLICATIONS

English translation of Search Report issued Jan. 4, 2016 in corresponding Chinese Application No. 201410446714.5.

*Primary Examiner* — Bruce H Hess
(74) *Attorney, Agent, or Firm* — Wenderoth, Lind & Ponack, L.L.P.

(57) ABSTRACT

A decorative film includes a base film, a colored layer formed of UV curable ink, and an ink-absorbing layer. The ink-absorbing layer is formed between the base film and the colored layer, provided with voids therein, and contains filler made of photorefractive material.

11 Claims, 8 Drawing Sheets

(52) U.S. Cl.
CPC ............ *B41M5/5272* (2013.01); *B41M 5/5281* (2013.01); *B41M 2205/10* (2013.01)

(56) References Cited

U.S. PATENT DOCUMENTS

2003/0157278 A1    8/2003    Takahashi et al.
2003/0235681 A1    12/2003    Sebastian et al.
2006/0115639 A1    6/2006    De Vries et al.
2009/0242114 A1    10/2009    Nishimura
2010/0143615 A1    6/2010    Hsu

FOREIGN PATENT DOCUMENTS

JP    2008-272946    11/2008
WO    2007/063995    6/2007

\* cited by examiner

FIG. 8A PRIOR ART
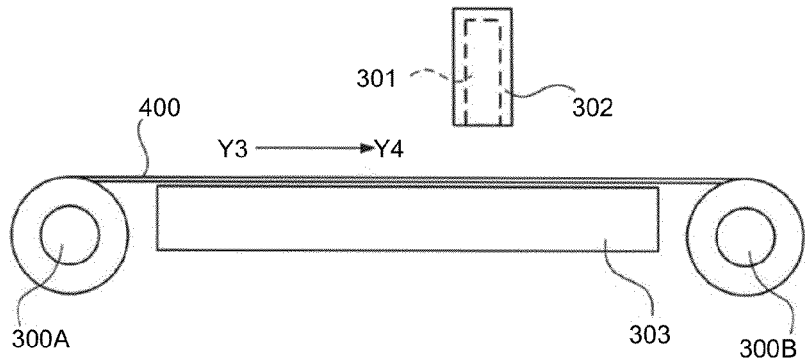
FIG. 8B PRIOR ART
FIG. 8C PRIOR ART
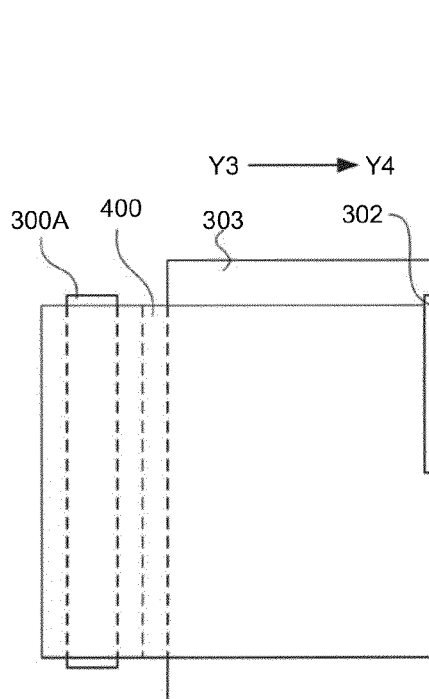
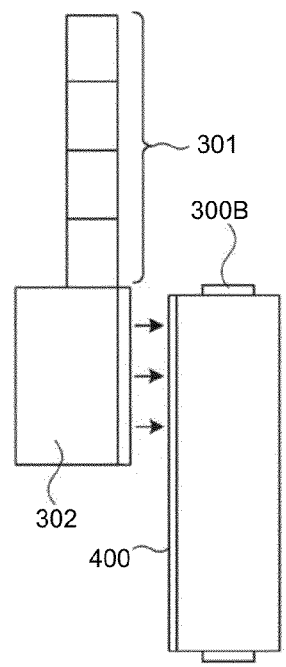
FIG. 8D PRIOR ART
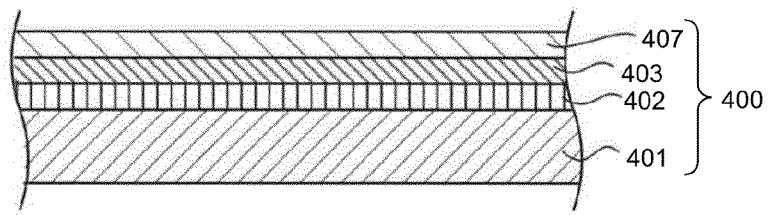

DECORATIVE FILM AND MOLDED PRODUCT INCLUDING THE SAME

BACKGROUND

1. Field of the Disclosure

The present disclosure relates to a decorative film for decorating the surface of a resin molded product, and also to a molded product including the decorative film. In particular, the present disclosure relates to a decorative film that hardly causes the ink to bleed, which may conventionally occur in a colored layer formed by an ink-jet printer.

2. Background Art

In recent years, in-mold decorative films have been commercially available, which include colored layers printed by an ink-jet printer in order to create various designs and patterns. This type of decorative films does not need plates for printing, which results in a low cost and a short lead time and is also suitable for on-demand printing of high-mix, low-volume products.

It has been proposed to use ultraviolet (hereinafter, UV) curable inks for these decorative films because they can dry and cure much faster than water- and solvent-based inks.

FIGS. 8A to 8C show the configuration of an ink-jet printer with UV curable ink. FIG. 8D is a sectional view of a conventional partial layer film, which is printed by this printer.

In the printer, supply reel 300A is wound with partial layer film (hereinafter, film) 400, which is a continuous film. As shown in FIG. 8D, film 400 includes base film 401, which is, for example, a PET or acrylic film. Release layer 402, protective layer (also called, the hard coat layer) 403, and anchor layer 407 are formed in that order on base film 401. Film 400 is wound around supply reel 300A in a manner that base film 401 is located inside and anchor layer 407 is located outside.

Film 400 is rolled out from supply reel 300A, fed over stage 303 in the direction from Y3 to Y4, and taken up on take-up reel 300B. Stage 303 suctions air to fix film 400 thereon so as to be in print position.

As shown in FIGS. 8A to 8C, above stage 303, the printer includes ink-jet head (hereinafter, head) 301 and UV lamp unit 302, which cures ink ejected from head 301 and landed on anchor layer 407. Head 301 includes a plurality of heads for different colors, and these heads are arranged in the X1-X2 directions crossing the direction to transfer film 400 (from Y3 to Y4). When head 301 and UV lamp unit 302 move from X1 to X2 over film 400, ink ejected from head 301 is printed on film 400. When head 301 and UV lamp unit 302 return from X2 to X1, UV lamp unit 302 cures the UV ink landed during the travel from X1 to X2 with UV light. When the printing for one line is completed, head 301 and UV lamp unit 302 move from Y3 toward Y4 to repeat the printing operation.

When this operation is over, stage 303 releases film 400 from suction. Take-up reel 300B takes up film 400 with an arbitrary length in the direction from Y3 to Y4 so as to include portions where the colored layer has not been formed yet.

This type of ink-jet printing is called a multi-pass type. In this type, the colored layer is formed on the surface of anchor layer 407, but the printing speed is as low as 0.1 m/min or less on an average, indicating poor productivity.

In recent years, single-pass ink-jet printers, which are free from this problem, have been commercially available. FIGS. 9A and 9B show the configuration of a single-pass ink-jet printer.

Unlike in the multi-pass type, in the single-pass type, ink-jet head (hereinafter, head) 501 and UV lamp unit (hereinafter, unit) 502 are in the fixed position while film 400 is being fed from Y5 toward Y6 in order to be printed.

More specifically, supply reel 500A and take-up reel 500B control film 400 to be continuously fed from Y5 toward Y6 in order to be printed. The printer further includes cylindrical stage 505, which is composed of rotating cylindrical rollers and is disposed under head 501 so that film 400 can be fed smoothly. Film 400 is not fixed by air-suction by stage 505, but is fed with an arbitrary tension applied thereto.

Head 501 includes a plurality of nozzles for each color. The nozzles for the same color are arranged in a direction crossing the Y5-Y6 directions within the print width of film 400. The nozzles for different colors are parallel-arranged in the Y5-Y6 directions. Head 501 includes an arbitrary number of heads depending on the print width, the image resolution, and the number of ink colors required.

In this configuration, UV curable ink 601 is ejected onto film 400 continuously being fed under head 501, thereby forming colored layer 504 with arbitrary images printed thereon. Then, unit 502 in the downstream of head 501 applies UV light to colored layer 504 to photo-cure (polymerized) it, and hence, a decorative film is completed. This decorative film is then taken up on take-up reel 500B.

The single-pass type can print at a speed as high as 20 m/min or more, indicating much higher productivity than the multi-pass type.

SUMMARY

The decorative film of the present disclosure includes a base film, a colored layer formed of UV curable ink, and an ink-absorbing layer. The ink-absorbing layer is formed between the base film and the colored layer, provided with voids therein and contains filler made of photorefractive material.

The molded product of the present disclosure includes a body and a transfer portion. The transfer portion is formed on the surface of the body and includes an ink-absorbing layer and a colored layer. The colored layer is formed of UV curable ink. The ink-absorbing layer contains filler made of photorefractive material and is provided with voids therein.

With the above configuration, the colored layer hardly causes the ink to bleed.

BRIEF DESCRIPTION OF DRAWINGS

FIG. 8A is a configuration illustration of a conventional ink-jet printer with UV curable ink.

FIG. 8B is a plan view of the ink-jet printer with UV curable ink shown in FIG. 8A.

FIG. 8C is a partial side view of the ink-jet printer with UV curable ink shown in FIG. 8A.

FIG. 8D is a sectional view of a conventional partial layer film.

DETAILED DESCRIPTION OF THE DISCLOSURE

Figure 1A:
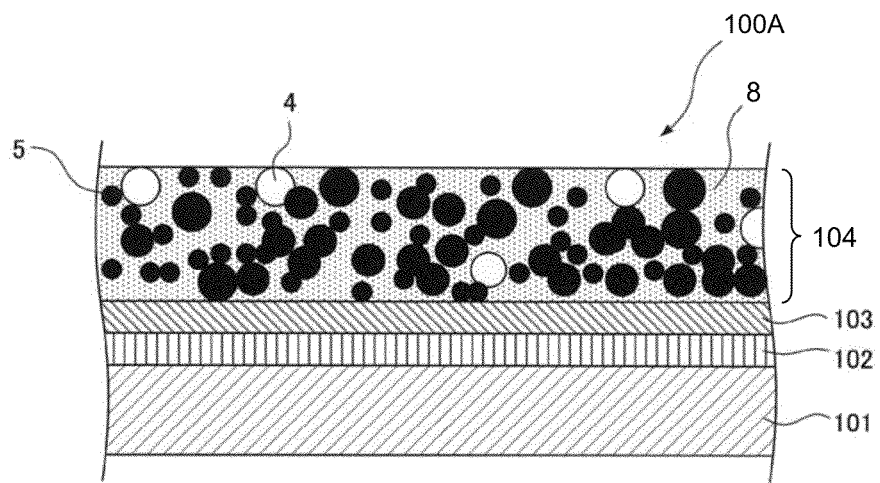
FIG. 1A is a sectional view of a partial layer film of a first exemplary embodiment of the present disclosure before a colored layer is formed by printing.

Conventional issues will now be described prior to describing exemplary embodiments of the present disclosure.

A single-pass ink-jet printer with UV curable ink includes heads for CMYK colors arranged continuously. Unlike in a multi-pass type, ink 601 is continuously ejected from head 501 to the predetermined spots on film 400, and is then cured quickly with a UV lamp of unit 502. In this printing method, uncured droplets of ink 601 are continuously landed on film 400. The uncured droplets of ink 601 thus landed may spread and join together, thereby causing the ink to bleed.

An object of the present disclosure is to provide a decorative film in which ink droplets landed to form a printed colored layer are prevented from spreading and joining together so that no ink bleeding is caused, and in which the colored layer can be sufficiently cured. Another object of the present disclosure is to provide a molded product including the decorative film.

The exemplary embodiments of the present disclosure will now be described with reference to the attached drawings. In these embodiments, the same components as in the preceding embodiments will be denoted by the same reference numerals, and thus a detailed description thereof may be omitted in the subsequent embodiments.

First Exemplary Embodiment

FIG. 1A is a sectional view of partial layer film (hereinafter, film) 100A before a colored layer is formed. Film 100A includes base film 101 on which release layer 102, protective layer (hard coat layer) 103, and ink-absorbing layer 104 are formed in that order.

Base film 101 is, for example, a PET or acrylic film, and has an average thickness of 20 to 100 μm. The average total thickness between release layer 102 and ink-absorbing layer 104 inclusive is 6 to 70 μm after drying.

Protective layer 103 is of a UV curable type to be cured after molding. This means that protective layer 103 is a hard coat layer which is cured with UV radiation 3 after in-molding described later. Therefore, at the stage when film 100A is completed, the resin forming protective layer 103 is not completely photo-cured (polymerized), but is either uncured or semi-cured. Protective layer 103 can be made, for example, of a material that is photo-cured (polymerized) using a metal halide lamp after in-molding.

Ink absorbing layer 104 includes resin 8 as the main material, and filler 5, which is dispersed in resin 8 and is composed of highly refractive particles. In other words, filler 5 is made of photorefractive material. Ink absorbing layer 104 is provided with voids 4 therein. Resin 8 can be a general resin such as acrylic resin, urethane resin, polyester resin, or vinyl chloride resin.

Voids 4 in ink-absorbing layer 104 are formed between contiguous particles of filler 5 which are different in average particle diameter. Filler 5 can be composed of highly refractive and photo-semiconductor particles, for example, of zinc oxide and titanium oxide because of their ready availability. The zinc oxide and titanium oxide can be used either alone or in combination. Note, however, that other materials can be used as filler 5 as long as similar effects are obtained.

Base film 101 has a thickness of 50 μm. Release layer 102 has an average thickness of approximately 1 μm after drying. Protective layer 103 is of a UV curable type to be cured after molding and has an average thickness of 5 μm after drying. Ink absorbing layer 104 has an average thickness of 10 μm after drying. It is preferable that the average thickness of ink-absorbing layer 104 be in the range from 5 to 60 μm after drying. Ink absorbing layer 104 having an average thickness within this range can have both transparency and the ability to absorb the ink for colored layer 204. Note, however, that these layers can have other thicknesses as long as similar effects are obtained.

Figure 1B:
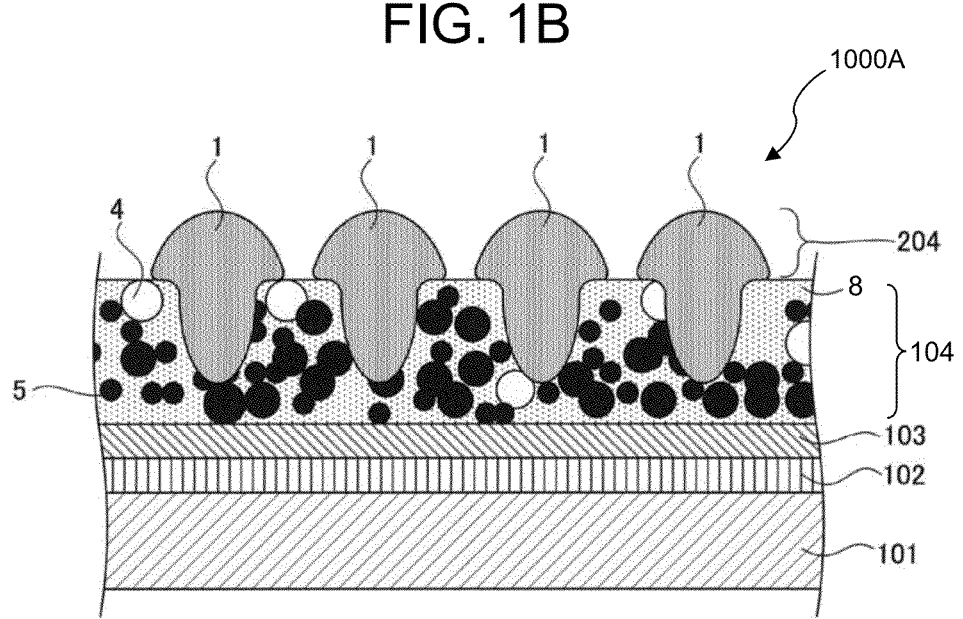
FIG. 1B is a sectional view of a decorative film of the first exemplary embodiment of the present disclosure.

Colored layer 204 is formed on ink-absorbing layer 104 to create decorative film 1000A shown in FIG. 1B. Decorative film 1000A can be used for in-molding to create a molded product having a transfer layer on the surface of its body. Such a molded product will be described later with reference to FIG. 5B.

Figure 2A:
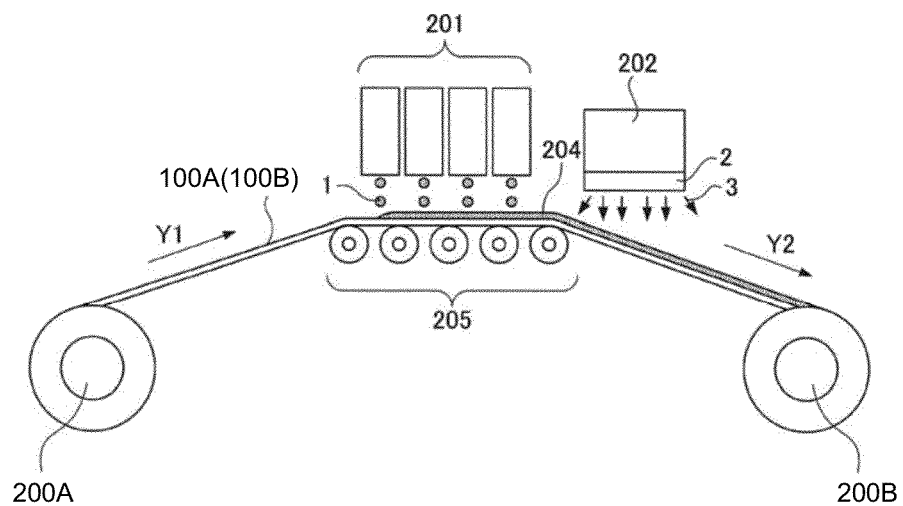
FIG. 2A is a configuration illustration of an ink-jet printer used to form the colored layer on the partial layer film shown in FIG. 1A.
Figure 2B:
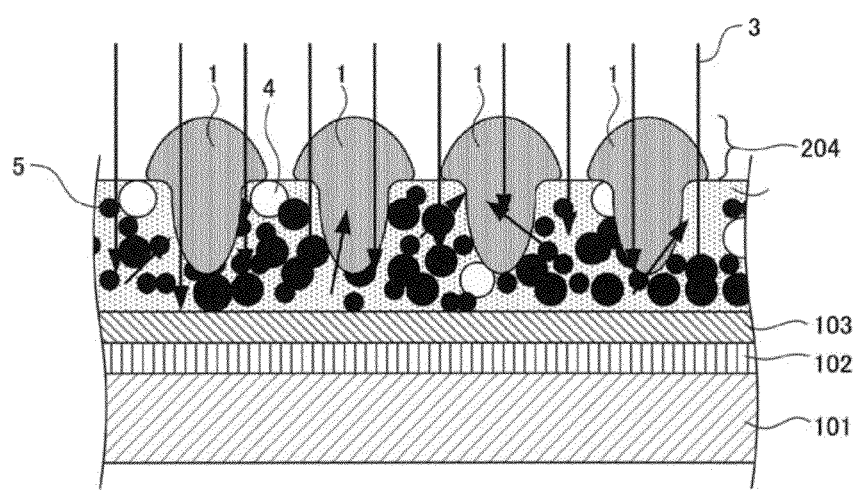
FIG. 2B is a sectional view of the partial layer film while the landed ink is being cured.

The procedure for creating decorative film 1000A by printing ink 1 on ink-absorbing layer 104 will now be described with reference to FIGS. 2A and 2B. FIG. 2A is a configuration illustration of an ink-jet printer used to form colored layer 204 on film 100A. FIG. 2B is a sectional view of film 100A while landed ink 1 is being cured.

The ink-jet printer shown in FIG. 2A includes ink-jet head (hereinafter, head) 201, UV lamp unit (hereinafter, unit) 202, stage 205, supply reel 200A, and take-up reel 200B. Film 100A shown in FIG. 1A is set in the ink-jet printer, and ink 1 is printed on ink-absorbing layer 104.

Film 100A wound around supply reel 200A is continuously fed in the direction from Y1 to Y2 over stage 205 and is taken up on take-up reel 200B. In this situation, ink 1 ejected from head 201 is printed on film 100A. The printer further includes cylindrical stage 205, which is composed of rotating cylindrical rollers and is disposed under head 201 so that film 100A can be fed smoothly. Film 100A is not fixed by air-suction by stage 205, but is fed with an arbitrary tension applied thereto.

Head 201 include a plurality of nozzles for each color. The nozzles for the same color are arranged in a direction crossing the Y1-Y2 directions within the print width of film 100A. The nozzles for different colors are parallel-arranged in the Y1-Y2 directions. Head 201 includes an arbitrary number of heads depending on the print width, the image resolution, and the number of ink colors required.

In this configuration, UV curable ink 1 is ejected onto film 100A continuously being fed under head 201, thereby forming colored layer 204 with arbitrary images printed thereon.

When colored layer 204 are formed of uncured ink 1 which is just landed on ink-absorbing layer 104, the uncured ink 1 is partially absorbed into ink-absorbing layer 104 provided with voids 4. Thus, ink 1 landed on ink 1 is partially absorbed into voids 4 in ink-absorbing layer 104 quickly, thereby reducing the amount of ink 1 that is exposed on ink-absorbing layer 104. As a result, a less amount of ink 1 spreads on ink-absorbing layer 104, making it less likely that adjacent droplets of ink 1 join together on ink-absorbing layer 104. As a result, ink bleed is prevented.

Thus, film 100A in which ink-absorbing layer 104 are provided with ink dots is fed under unit 502 in the downstream of head 201. UV lamp unit 202 includes UV lamp 2, which emits UV radiation 3 from above colored layer 204 while film 100A is being fed under it. As a result, colored layer 204 is photo-cured (polymerized), and hence, decorative film 1000A is completed. Decorative film 1000A is taken up on take-up reel 200B.

UV radiation 3 thus applied passes through colored layer 204 and reaches ink-absorbing layer 104 as shown in FIG. 2B. Consequently, UV radiation 3 cures not only ink 1 that exists on the surface of ink-absorbing layer 104 but also ink 1 that is absorbed into voids 4 by being reflected and scattered by filler 5 after entering ink-absorbing layer 104. Thus, UV radiation 3 accelerates the cure of both ink 1 exposed on ink-absorbing layer 104 and ink 1 inside ink-absorbing layer 104.

In the case that filler 5 is composed of photo-semiconductor particles such as zinc oxide and titanium oxide, which generate electrons on exposure to light, the photoelectric effect of UV radiation 3 accelerates the cure of the ink in voids 4. In the case that ink 1 is dense or contains a black- or blue-based pigment, UV radiation 3 that has reached ink 1 is partially absorbed into the pigment, failing to accelerate the curing reaction of ink 1. In the case that ink-absorbing layer 104 contains filler 5 composed of photo-semiconductor particles, UV radiation 3 that has reached the inside of ink-absorbing layer 104 exhibits a photoelectric effect, thereby generating reactive electrons inside ink-absorbing layer 104. Electrons directly contribute to the curing reaction of ink 1 because they do not depend on conditions such as the density of ink 1 and the type of the pigment and are not absorbed into the pigment. As a result, the curing reaction of ink 1 proceeds more effectively both on and inside ink-absorbing layer 104.

Protective layer 103 is cured by irradiation of light of which wavelength is mainly in the range of 300 nm or less. Therefore, in the case that the wavelength range used for the photo-cure reaction of ink 1 is mainly in a wide range from 300 to 400 nm, it is preferable to use a UV light emitting diode which emits UV radiation not containing many wavelengths contributing to the cure of protective layer 103, as UV lamp 2.

In this case, the wavelength range of UV radiation 3 from UV lamp 2 is in a range from 360 to 410 nm, and the peak wavelength is 385 nm. Filler 5 dispersed in ink-absorbing layer 104 can be composed of zinc oxide having an average particle diameter of 0.03 μm. This zinc oxide changes UV radiation 3 in the wide wavelength range of 300 to 370 nm into scattered light and reflected light, and allows UV radiation 3 to exhibit a photoelectric effect.

Using titanium oxide and zinc oxide together as filler 5 can change UV radiation 3 having wavelengths of 300 to 350 nm into scattered light and reflected light. It is, therefore, preferable to use these oxides together in order to reflect and scatter UV radiation 3 having wavelength in a range from 300 to 370 nm more effectively.

The content of zinc oxide in filler 5 dispersed into resin 8 is, for example, 100 parts by weight per 100 parts by weight of resin 8. Assume that ink-absorbing layer 104 containing the zinc oxide and resin 8 in the above ratio is formed with an average thickness of 10 μm after drying. In this case, ink-absorbing layer 104 is approximately 12 μm at its thickest point and approximately 8 μm at its thinnest point.

It is preferable that filler 5 have a particle size smaller than the thickness of ink-absorbing layer 104. In this case, ink-absorbing layer 104 can have spaces between adjacent particles of filler 5 into which some of the resin particles cannot enter. In ink-absorbing layer 104 containing filler 5 dispersed therein, these spaces become voids 4 existing between some of the adjacent particles of filler 5. As a result, ink-absorbing layer 104 has a porous structure.

In order to form as many voids 4 as possible in ink-absorbing layer 104, in the case that ink-absorbing layer 104 has an average thickness of 10 μm, it is preferable that the average particle diameter of filler 5 be smaller than half of the thickness of ink-absorbing layer 104. More specifically, the preferable average particle diameter of filler 5 is within the range from 0.01 μm to 4 μm, inclusive. If the average particle diameter is less than 0.01 μm, the surface area of the particles is too small to obtain sufficient effects of UV radiation 3 such as reflection, scattering, absorption, and photoelectric effects.

Different materials of filler 5 may show large differences in the properties of UV radiation 3 such as reflection, scattering, absorption, and photoelectric effect; the transparency of ink-absorbing layer 104; and/or the effects of voids 4 existing between adjacent particles of filler 5. For this reason, it is impossible to explicitly specify the preferable range of the average particle diameter of filler 5. Thus, the average particle diameter is not limited to the above-mentioned range as long as similar effects are obtained.

It is also preferable that filler 5 be composed of two or more kinds of materials with different average particle diameters. This makes it easier to form voids 4, and also to control the viscosity of ink-absorbing layer 104 (coating agent) when it is applied.

Voids 4 can be formed more easily using filler that either is composed of porous particles or contains voids. Alternatively, voids 4 can be formed by other methods than using filler 5. For example, ink-absorbing layer 104 in which resin 8 contains a component capable of being volatilized by the application of a certain amount of heat can be applied and dried, or ink-absorbing layer 104 in which resin 8 contains air bubbles can be applied and dried.

It is preferable that the content of filler 5 dispersed in resin 8 be in the range from 10 to 185 parts by weight, inclusive, per 100 parts by weight of resin 8 forming ink-absorbing layer 104. If the content of filler 5 is less than 10 parts by weight, in ink-absorbing layer 104, UV radiation 3 is unlikely to be successfully applied to filler 5 composed of highly refractive particles. As a result, the reflection and scattering effects of UV radiation 3 are insufficient. Similarly, in the case that filler 5 is composed of photo-semiconductor particles, UV radiation 3 is unlikely to be successfully applied to the photo-semiconductor particles. As a result, UV radiation 3 fails to exhibit a sufficient photoelectric effect contributing to the curing reaction of colored layer 204. In contrast, if the content of filler 5 exceeds 185 parts by weight, the content of resin 8 is very small relative to the content of filler 5. This causes ink-absorbing layer 104 to be fragile and insufficient in characteristics, such as elongation properties required at the time of injection molding the molded product.

In order to disperse filler 5 into resin 8 more easily, a dispersion liquid containing filler 5 can be dispersed, instead of filler 5 itself, into resin 8. This dispersion liquid can be prepared by subjecting filler 5 to a coupling treatment and then dispersing it in a dispersion medium.

If needed, a light stabilizer, an antioxidant, and other agents may be dispersed together into resin 8 in ink-absorbing layer 104. Alternatively, a treatment that has similar effects can be applied. For example, filler 5 may be coated with a light stabilizer, an antioxidant, and other agents, and then be dispersed into resin 8. In this configuration, resin 8 is less likely to be decomposed or degraded by the catalytic activity of filler 5. It is also possible to add a light stabilizer, an antioxidant, and other agents to colored layer 204, protective layer 103, and anchor layer 107 each of which is adjacent to ink-absorbing layer 104 in order to prevent the degradation due to UV radiation 3.

Resin 8 forming ink-absorbing layer 104 can be any of thermoplastic, thermosetting, and photo-curing resins. The main material of resin 8 only needs to be a general, highly transparent material such as acrylic-based, urethane-based, and vinyl chloride-based materials. The resin material (coating agent) used for ink-absorbing layer 104 having filler 5 dispersed therein can be applied using common coating methods for forming the other layers of film 100A. Specific examples include screen printing, gravure printing, ink-jet printing, and coating. The viscosity of the resin material for ink-absorbing layer 104 can be adjusted to the adopted method.

Thus, UV radiation 3 collides with filler 5 dispersed in ink-absorbing layer 104, and becomes scattered light and reflected light, thereby reaching colored layer 204 again. In the case that UV radiation 3 collides with filler 5 composed of photo-semiconductor particles, UV radiation 3 exhibits a photoelectric effect, allowing filler 5 to generate electrons. The generated electrons enter colored layer 204, which causes a redox reaction, thereby accelerating the curing reaction of ink 1. As a result, colored layer 204 is exposed to UV radiation 3 from both above and below, and some of the electrons generated by the photoelectric effect reach colored layer 204. Thus, the curing reaction of ink 1 proceeds more effectively than in the conventional case in which film 400 is exposed to UV radiation from the above only. In short, ink 1 is cured at a much higher speed. Consequently, less area of colored layer 204 remains uncured after having passed under UV lamp unit 502. In addition, the curing reaction of ink 1 that has been absorbed into ink-absorbing layer 104 proceeds quickly. This makes colored layer 204 less likely to have blocking problems at the time of being taken up on take-up reel 200B. As a result, the ink-jet printer with UV curable ink does not need to slow down its printing speed, and it becomes unnecessary to provide additional UV lamp units and UV lamps.

Figure 9A:
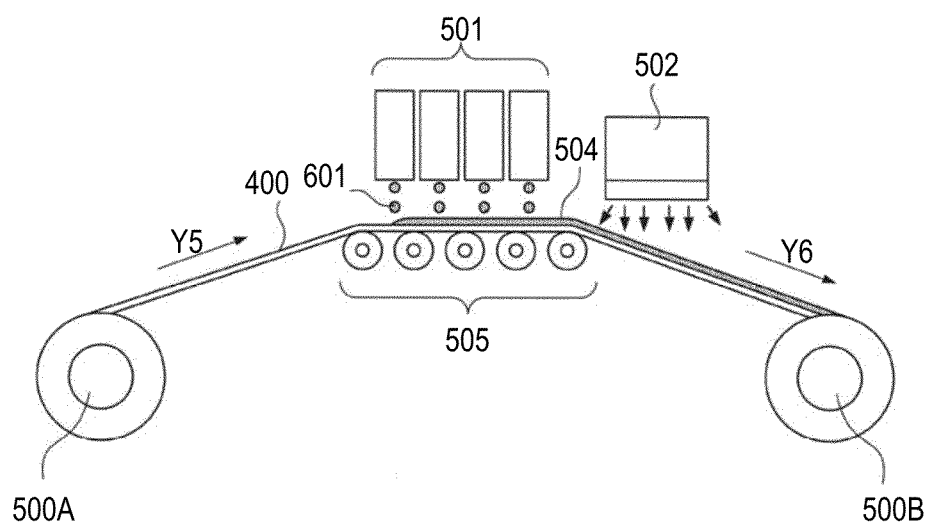
FIG. 9A is a configuration illustration of a conventional single-pass ink-jet printer.
Figure 9B:
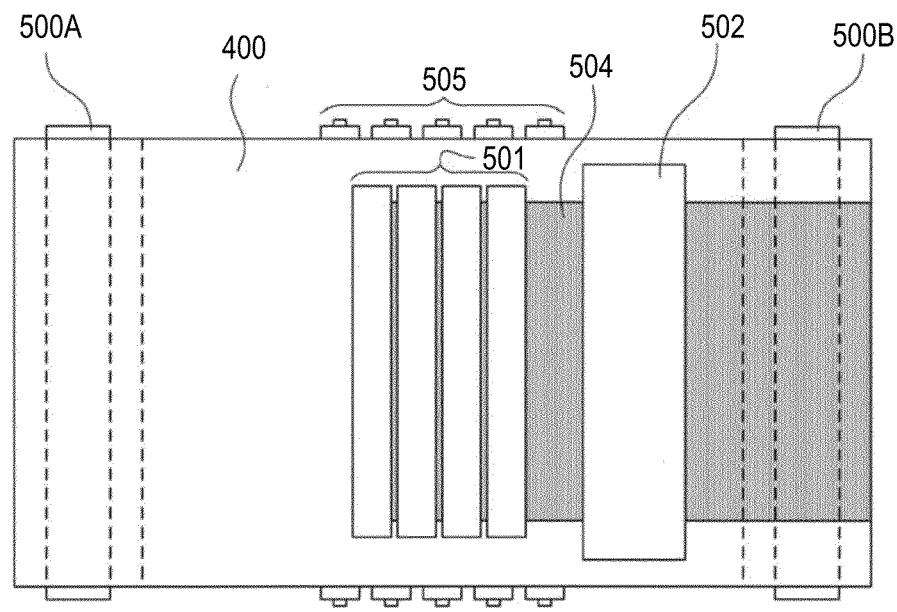
FIG. 9B is a plan view of the ink-jet printer shown in FIG. 9A.

In the case that a UV curable ink is printed on conventional partial layer film 400 shown in FIG. 8D at a high speed by an ink-jet printing, the UV radiation for curing colored layer 504 shown in FIG. 9A passes through colored layer 504 and reaches protective layer 403 or other underlying layers. As described previously, it is often the case that protective layer 403 is of a UV curable type to be cured after molding and has curing conditions similar to those of ink 601 forming colored layer 504. This makes it more likely that protective layer 403 is cured by UV radiation before in-molding. If protective layer 403 is photo-cured (polymerized) before molding, peeling failure occurs between protective layer 403 and release layer 402 after molding.

In contrast, in film 100A shown in FIG. 1A, ink-absorbing layer 104 formed between protective layer 103 and colored layer 204 contains filler 5 composed of highly refractive particles. Therefore, UV radiation 3 that has passed through colored layer 204 is partially reflected by ink-absorbing layer 104, instead of passing through it. As a result, even if protective layer 103 is of a UV curable type to be cured after molding, protective layer 103 is prevented from being cured before in-molding. Consequently, release layer 102 and protective layer 103 are unlikely to cause peeling failure. Thus, a high-grade in-mold molded product with minor appearance defects can be obtained. In addition, the in-mold molded product can be easily peeled off from base film 101. This eliminates the need to stop the machine and to peel off the in-mold molded product from base film 101 by hand, thereby achieving a continuous molding process. In addition, film 100A itself can be effectively prevented from being degraded by UV radiation 3 during ink-jet printing.

Figure 3:
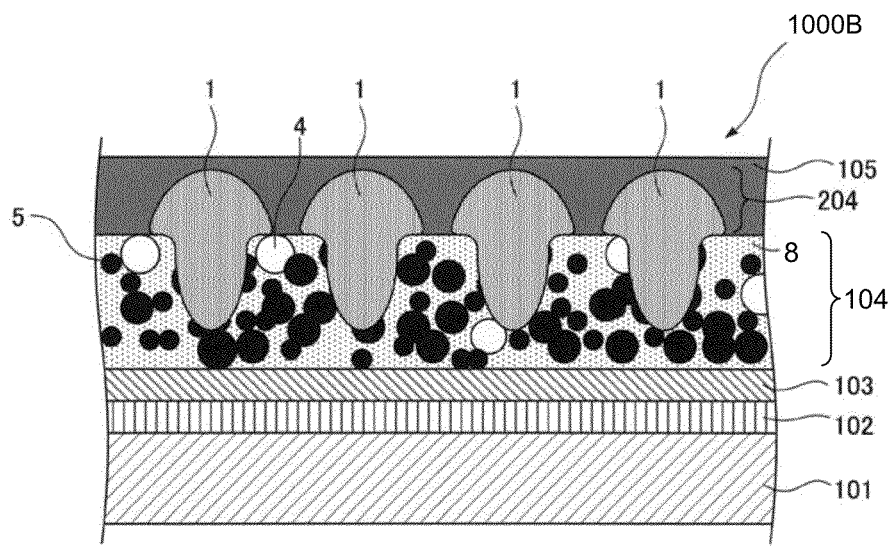
FIG. 3 is a sectional view of another decorative film of the first exemplary embodiment of the present disclosure.

In decorative film 1000A shown in FIG. 1B, ink-absorbing layer 104 is partially exposed from colored layer 204. Alternatively, as shown in FIG. 3, it is possible to form adhesive layer 105 coating colored layer 204 and those portions of ink-absorbing layer 104 which are exposed from colored layer 204. FIG. 3 is a sectional view of decorative film 1000B thus formed. Adhesive layer 105 increases the bond between the molded product and decorative film 1000B.

Figure 4A:
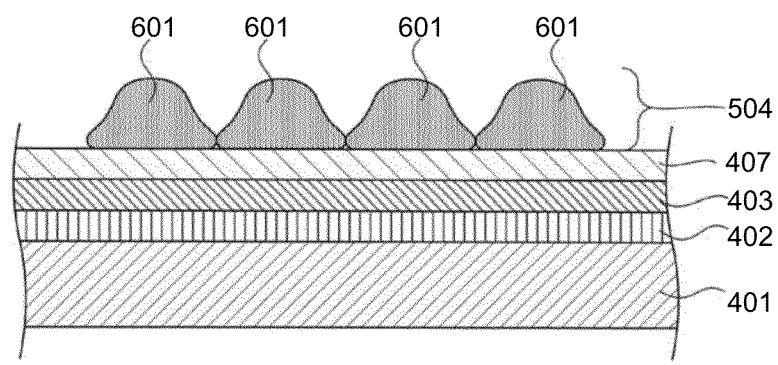
FIG. 4A is a sectional view of a decorative film of Comparative Example 1.
Figure 4B:
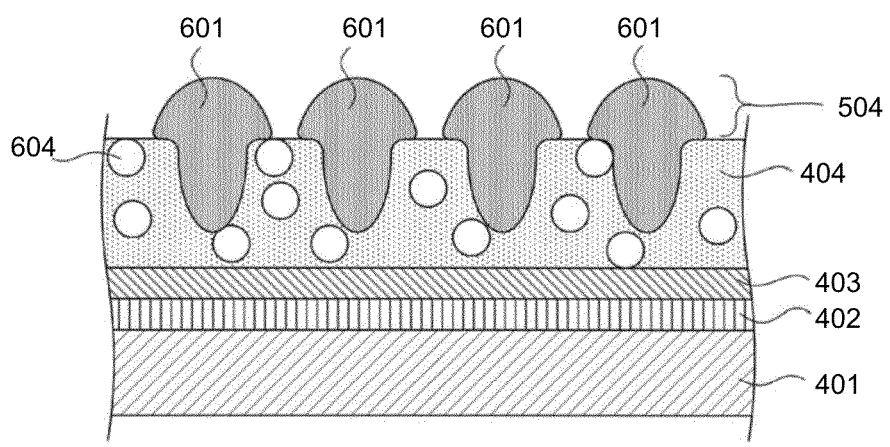
FIG. 4B is a sectional view of a decorative film of Comparative Example 2.

Next, decorative film 1000A shown in FIG. 1B will be compared with comparative examples as follows. FIG. 4A is a sectional view of a decorative film of Comparative Example 1. The decorative film is printed on the conventional partial layer film 400 by a single-pass high-speed ink-jet printer with UV curable ink. FIG. 4B is a sectional view of a decorative film of Comparative Example 2. The decorative film is formed under the same conditions as decorative film 1000A except for having ink-absorbing layer 404 instead of ink-absorbing layer 104. Ink absorbing layer 404 contains voids 604, but not filler 5.

As described above, in film 100A shown in FIG. 1A, ink-absorbing layer 104 contains filler 5 and voids 4 dispersed therein. Therefore, as shown in FIG. 1B, after printed, colored layer 204 hardly contains uncured portions, and ink 1 in colored layer 204 is partially absorbed and cured inside voids 4 in ink-absorbing layer 104. This prevents ink 1 forming colored layer 204 from spreading, thereby preventing adjacent droplets of ink 1 from joining together and decreasing the image resolution.

In contract, in Comparative Example 1 shown in FIG. 4A, anchor layer 407, which does not have the function of absorbing ink 601, is formed instead of ink-absorbing layer 104. Therefore, the landed particles of ink 601 forming colored layer 504 easily spread by gravitation, making the adjacent particles of ink 601 likely to join together.

In Comparative Example 2 shown in FIG. 4B, ink 601 landed is partially absorbed into ink-absorbing layer 404. As a result, adjacently landed droplets of ink 601 spread and join together less than in Comparative Example 1, thereby reducing ink bleed. Making ink 601 penetrate into ink-absorbing layer 404 can not only reduce the spread of ink 601 but also increase the thickness of ink 601. Therefore, even if ink 601 has a low color density, the obtained image has a high color density and high resolution. However, ink 601 is less exposed on ink-absorbing layer 404 and is absorbed deeper than in Comparative Example 1. For this reason, UV radiation for curing ink 601 cannot easily reach ink 601 inside ink-absorbing layer 404, and consequently causes some of ink 601 inside ink-absorbing layer 404 remains uncured. This causes the printed film to have blocking problems when it is taken up, or ink 601 in colored layer 504 to be flown out during injection molding the molded product.

In contrast, in film 100A shown in FIG. 1A, ink-absorbing layer 104 contains filler 5 and voids 4 exist between adjacent particles of filler 5. In addition, filler 5 is composed of highly refractive particles. Because of these features, film 100A does not have the problem of Comparative Example 2 that ink 601 in ink-absorbing layer 404 is not sufficiently cured. Moreover, when UV radiation 3 reaches filler 5 in ink-absorbing layer 104, filler 5 reflects and scatters UV radiation 3, thereby affecting ink 1. In the case that filler 5 is composed of highly refractive photo-semiconductor particles, UV radiation 3 exhibits a photoelectric effect, which allows filler 5 to generates electrons. The electrons cause a redox reaction when they reach ink 1. These effects accelerate the curing reaction of ink 1 absorbed into ink-absorbing layer 104, thereby preventing ink 1 from being cured insufficiently.

Thus, the use of film 100A to make decorative film 1000A effectively prevents ink 1 from being insufficiently UV cured even in the case of forming an image with high color density and excellent visibility and resolution. In addition, decorative film 1000A is prevented from having blocking problems when it is taken up after printing.

In some cases, in decorative film 1000A with film 100A printed thereon, adhesive layer 105 may additionally be formed on ink-absorbing layer 104 in line with it as shown in FIG. 3 before decorative film 1000A is taken up on take-up reel 200B. In other cases, adhesive layer 105 may be formed on ink-absorbing layer 104 on a different line from it after decorative film 1000A is taken up on take-up reel 200B. In the cases, as long as it is cured sufficiently, colored layer 204 is blocked from the solvent used in the formation of adhesive layer 105. In addition, ink 1 in colored layer 204 is prevented from flowing out during injection molding the molded product. Furthermore, the use of film 100A allows ink 1 in the colored layer 204 to partially penetrate into ink-absorbing layer 104, making a less volume of ink 1 exposed on ink-absorbing layer 104. As a result, colored layer 204 is unlikely to agglomerate. Therefore, in the subsequent injection molding process, the colored layer 204 is subjected to less injection pressure due to the injection-molded resin inside the mold. This makes ink 1 much less likely to be flown out from colored layer 204. As a result, colored layer 204 is effectively prevented from being cracked or broken during injection molding the molded product with the use of decorative film 1000A.

Figure 5A:
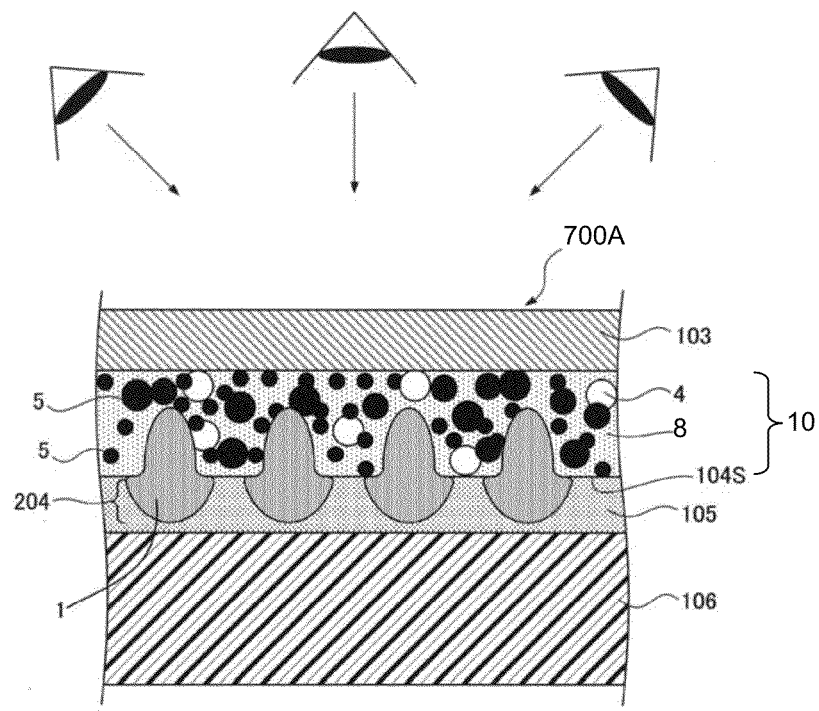
FIG. 5A is a sectional view of a molded product including the decorative film shown in FIG. 3.

FIG. 5A is a sectional view of molded product 700A, which includes decorative film 1000B and is produced by in-molding. Molded product 700A includes resin layer 106 as its body, protective layer 103, ink-absorbing layer 104, colored layer 204, and adhesive layer 105. Resin layer 106 is made of resin which is melted and then solidified. Colored layer 204 has designs and patterns. Protective layer 103 is the outermost layer of molded product 700A and protects colored layer 204 from dust and stains. Ink absorbing layer 104 contains voids 4 and filler 5. The UV curable ink in colored layer 204 is partially absorbed into voids 4 in ink-absorbing layer 104. Adhesive layer 105 brings the molten resin forming resin layer 106 into contact with colored layer 204. At least ink-absorbing layer 104 and colored layer 204 compose a transfer portion formed on the surface of resin layer 106.

Figure 5B:
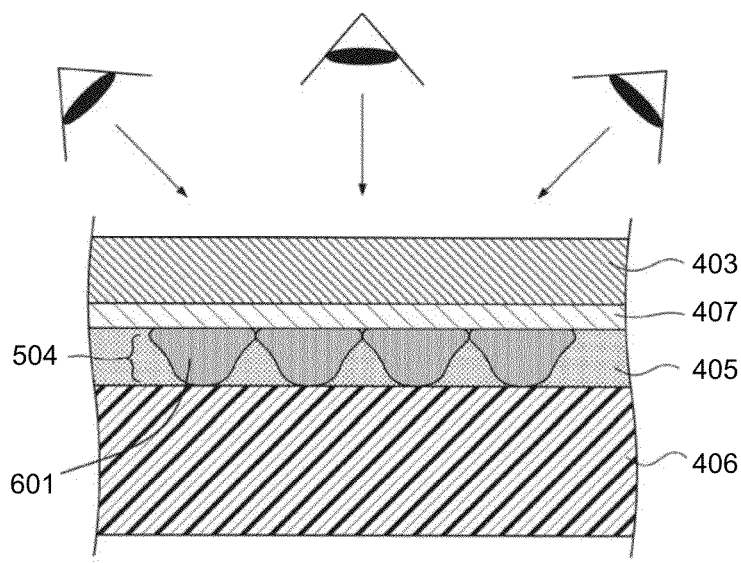
FIG. 5B is a sectional view of a molded product including the decorative film of Comparative Example 1.

FIG. 5B is a sectional view of a molded product, which includes the conventional decorative film shown in FIG. 4A and is produced by in-molding. In this molded product, adjacent droplets of ink 601 join together in colored layer 504. When colored layer 504 with images is viewed through protective layer 403, the resolution is low.

In contrast, in molded product 700A shown in FIG. 5A, the droplets of ink 1 in ink-absorbing layer 104 are thinner at a position close to resin layer 106 than at a position close to protective layer 103. In short, the droplets of ink 1 have a tapered shape. In other words, ink 1 forming colored layer 204 partially penetrates into ink-absorbing layer 104 in such a manner that each droplet of ink 1 has a shape tapering into ink-absorbing layer 104 from surface 104S of ink-absorbing layer 104.

Therefore, when viewed through protective layer 103, the droplets of ink 1 are easily recognized as dots, providing images with high resolution and visibility. The droplets of ink 1 extending in the depth direction have a depth feel if looked at from different angles, allowing the images to be viewed stereoscopically. As a result, molded product 700A can be high graded.

Molded product 700A may include a plurality of colored layers 204 depending on the design and pattern. To be more specific, after colored layer 204 is formed of UV curable ink 1, second and third colored layers may be formed using any of a solvent-based ink, a water-based ink, and a metallized layer that are adhesive with ink 1. Similarly, adhesive layer 105 may be formed, instead of the solvent-based adhesive, using any of a UV adhesive and a water-based adhesive that are adhesive with both colored layer 204 and resin layer 106.

In decorative film 1000A, after printing, ink 1 hardly remains uncured. Therefore, colored layer 204 is protected from the solvent contained in the ink or the adhesive when another solvent-based ink is applied to colored layer 204 or when adhesive layer 105 is formed as in the case of decorative film 1000B. Thus, colored layer 204 itself is prevented from degradation.

When photo-curing (polymerizing) protective layer 103 of a UV curable type is cured after molding, UV radiation 3 is applied with protective layer 103 in the outermost position. At this moment, UV radiation 3 is partially reflected and absorbed into filler 5 in ink-absorbing layer 104 underlying protective layer 103. This prevents colored layer 204, adhesive layer 105, and resin layer 106 from being subjected to and damaged by UV radiation 3. Also when molded product 700A is used under sunlight, it is unlikely that colored layer 204, adhesive layer 105, and resin layer 106 are degraded. Thus, molded product 700A is weather resistant.

In the above description, filler 5 is composed of zinc oxide and/or titanium oxide both of which have the effects of scattering and absorbing UV radiation and a photoelectric effect. Alternatively, filler 5 composed of highly refractive particles alone is effective, as compared with Comparative Examples 1 and 2. However, it is preferable that filler 5 contain photo-semiconductor material.

Second Exemplary Embodiment

Figure 6A:
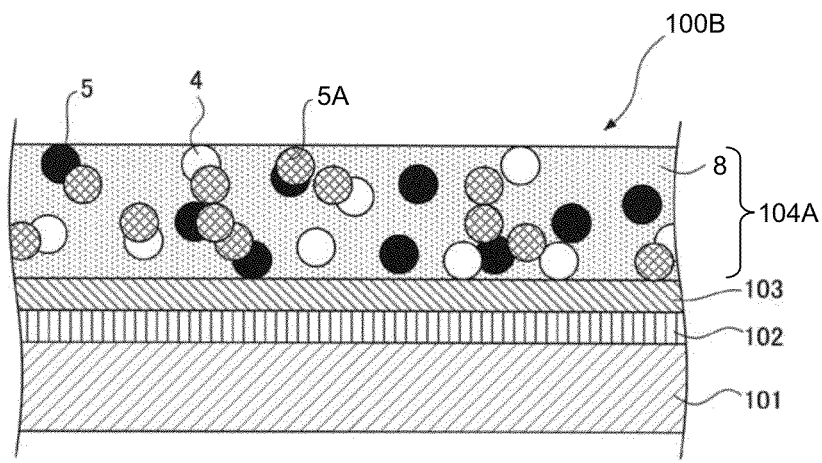
FIG. 6A is a sectional view of a partial layer film of a second exemplary embodiment of the present disclosure before a colored layer is formed by printing.
Figure 6B:
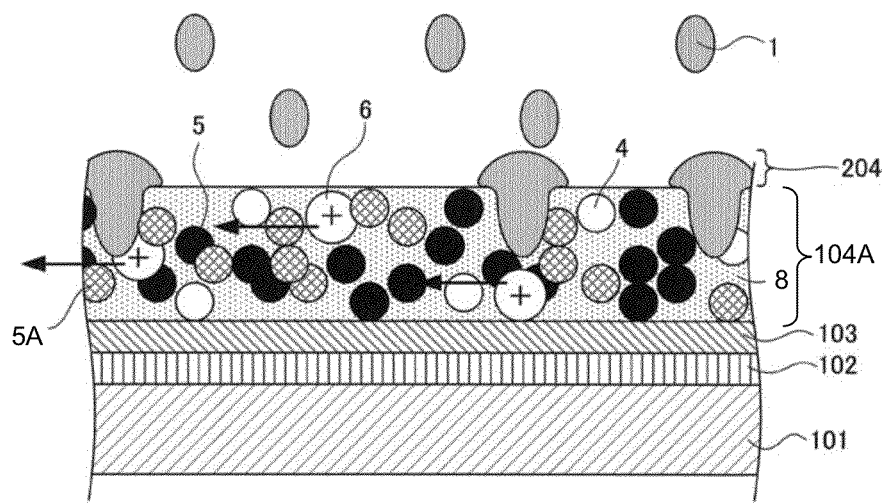
FIG. 6B is a sectional view of the partial layer film shown in FIG. 6A while a colored layer is being printed.

FIGS. 6A and 6B are sectional views of partial layer film (hereinafter, film) 100B of a second exemplary embodiment according to the present disclosure before and after, respectively, colored layer 204 begins to be formed by printing. A decorative film of the present exemplary embodiment will now be described with reference to these drawings.

Partial layer film 100B includes ink-absorbing layer 104A, which includes not only filler 5 described in the first exemplary embodiment but also filler 5A composed of conductive particles.

Filler 5A can be composed of conductive particles such as silver, copper, ITO (indium-tine oxide), gold, platinum, antimony oxide, zinc oxide, and a conductive polymer such as PEDOT (polyethylenedioxythiophene). Note that other materials can be used as filler 5A as long as similar effects are obtained. To have high conductivity, it is preferable that the conductive particles have high aspect ratio. For example, it is preferable that the conductive particles be linear-shaped, wire-shaped, or scale-shaped. Instead of the conductive polymer, an ionic conductive agent may be added.

As described in the first exemplary embodiment with reference to FIG. 2A, film 100A is continuously fed in the direction from Y1 toward Y2. In this case, film 100A is laid so that ink-absorbing layer 104 faces head 201. This causes friction between film 100A and stage 205, or between film 100A and unillustrated cylindrical rollers for applying tension on film 100A. This friction may induce electric charges on film 100A.

In contrast, in film 100B, ink-absorbing layer 104A contains not only filler 5 but also filler 5A. Therefore, even if electrons 6 are generated on film 100B by the friction between film 100B and stage 205 or the cylindrical rollers while film 100B is fed, electrons 6 are moved within ink-absorbing layer 104A by conductive filler 5A as shown in FIG. 6B. Therefore, film 100B is hardly electrically-charged. As a result, even if ink 1 ejected from head 201 is slightly charged, the charged ink 1 is hardly repelled or attracted by the charges of film 100B while film 100B is fed under head 201. Therefore, colored layer 204 is formed of ink 1 that is landed on the appropriate position.

Thus, the use of film 100B eliminates the need to provide electrostatic eliminators and other jigs in a lot of places in the ink-jet printer. It is also unnecessary to provide an antistatic layer in order to provide the partial layer film with an antistatic function. This results in the cost reduction of the devices and the partial layer film.

It is preferable that the content of filler 5A be in the range from 0.05 to 5 parts by weight, inclusive, per 100 parts by weight of resin 8 forming ink-absorbing layer 104A. If the content of filler 5A is less than 0.05 parts by weight, ink-absorbing layer 104A has insufficient conductivity. In the case that the content of filler 5A is over 5 parts by weight, the material cost is high, and the antistatic effect is not very high in spite of its content. Therefore, it is preferable that the content of filler 5A be in the above-mentioned range. Note, however, that the content of filler 5A can be set outside the above-mentioned range to suit different purposes. It is preferable that the optimum content of filler 5A be determined in consideration of the content of filler 5.

From the above-mentioned points of view, 100 parts by weight of zinc oxide having an average particle diameter of 0.03 μm as filler 5 and 0.2 parts by weight of silver having an average particle diameter of 0.05 μm as filler 5A are dispersed into 100 parts by weight of resin 8. Assume that this resin material (coating agent) is used to form ink-absorbing layer 104A having an average thickness of 10 μm. In this case, ink-absorbing layer 104A is approximately 11 μm at its thickest point and approximately 8 μm at its thinnest point.

Similar to the first exemplary embodiment, a light stabilizer, an antioxidant, and other agents may be dispersed together into ink-absorbing layer 104A in order to prevent degradation of ink-absorbing layer 104A due to UV radiation 3.

In the above description, filler 5 is composed of zinc oxide or titanium oxide in expectation of scattering, absorption, and photoelectric effects, and filler 5A is composed of conductive particles. Similar to the first exemplary embodiment, the use of filler 5 composed of highly refractive particles and filler 5A composed of conductive particles is effective, as compared with Comparative Examples 1 and 2.

Third Exemplary Embodiment

Figure 7A:
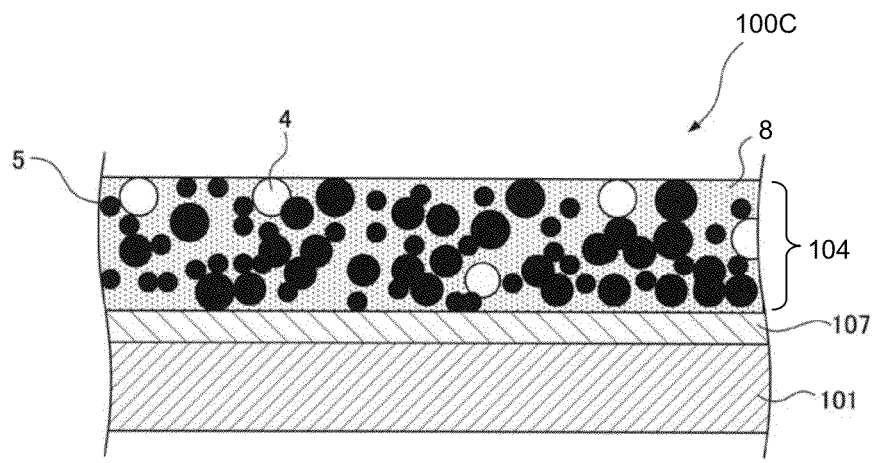
FIG. 7A is a sectional view of a partial layer film of a third exemplary embodiment of the present disclosure before a colored layer is formed by printing.
Figure 7B:
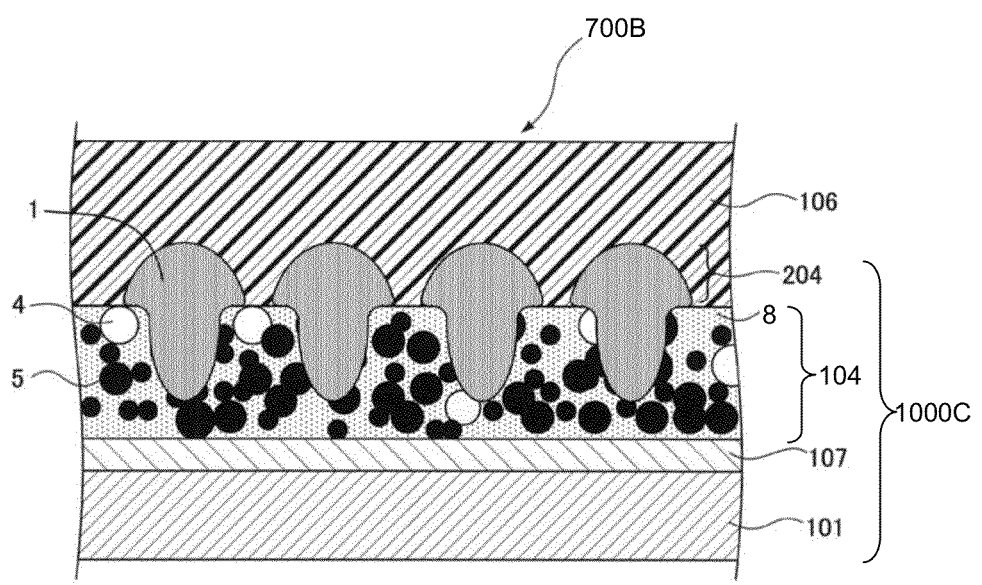
FIG. 7B is a sectional view of a molded product including a decorative film of the third exemplary embodiment of the present disclosure.

FIG. 7A is a sectional view of partial layer film 100C of a third exemplary embodiment of the present disclosure before colored layer 204 is printed. FIG. 7B is a sectional view of molded product 700B of the present exemplary embodiment. The following is a description of decorative film 1000C formed by printing ink 1 on partial layer film 100C, and molded product 700B including decorative film 1000C with reference to these drawings.

As shown in FIG. 7A, partial layer film 100C includes base film 101, anchor layer 107, and ink-absorbing layer 104. Anchor layer 107 is formed on base film 101. Ink absorbing layer 104 is formed on anchor layer 107.

Anchor layer 107 increases the adhesion between base film 101 and a coating agent or ink 1. Ink-absorbing layer 104 contains filler 5 and is provided with voids 4 therein. Ink absorbing layer 104 and filler 5 have the same compositions as those in the first exemplary embodiment.

Molded product 700B shown in FIG. 7B includes decorative film 1000C. In molded product 700B, base film 101 is transparent, and resin layer 106 is formed on the opposite side to anchor layer 107 with respect to ink-absorbing layer 104. At least ink-absorbing layer 104 and colored layer 204 compose a transfer portion formed on the surface of resin layer 106, which is the body of molded product 700B.

Molded product 700B is formed as follows. Decorative film 1000C is placed so that base film 101 fits the mold, and is temporarily molded. Then, molten resin for composing resin layer 106 is injected onto colored layer 204.

Decorative film 1000B of the first exemplary embodiment includes adhesive layer 105 on the surface of ink-absorbing layer 104. However, ink-absorbing layer 104 and resin layer 106 can be bonded to each other without providing adhesive layer 105 as in the present exemplary embodiment, depending on the type of resin 8 as the main material of ink-absorbing layer 104 or on the type of ink 1. This configuration provides effects similar to those in the first exemplary embodiment.

A protective layer may be provided on the opposite side of base film 101 with respect to ink-absorbing layer 104.

Similar to the second exemplary embodiment, in the present exemplary embodiment, ink-absorbing layer 104 may contain not only filler 5 composed of highly refractive particles and/or photo-semiconductor particles but also filler 5A composed of conductive particles. This configuration also provides an antistatic effect as in the second exemplary embodiment.

In the above description, filler 5 is composed of zinc oxide or titanium oxide in expectation of scattering, absorption, and photoelectric effects. However, similar to the first and second exemplary embodiments, filler 5 composed of highly refractive particles alone is effective as compared with Comparative Examples 1 and 2.

UV curable ink 1 may be replaced by electron-beam curable ink, and UV radiation may be replaced by electron beam to cure the ink. In the case that filler 5 is composed of photo-semiconductor particles having a photoelectric effect, the electron-beam curable ink can be cured by UV radiation.

As described above, the present disclosure is widely applicable to in-molding or insert-molding design of molded exterior components of AV appliances such as TVs and audio equipment, mobile telephones, and automobiles.

What is claimed is:

1. A decorative film comprising:
    a base film;
    a colored layer which is a cured product of ultraviolet curable ink; and
    an ink-absorbing layer formed between the base film and the colored layer, provided with voids therein, and containing filler made of photorefractive material,
    wherein the filler reflects and scatters an ultraviolet radiation applied from above the colored layer, and a part of the ink penetrates into the ink-absorbing layer and is cured in the ink-absorbing layer by the reflected and scattered ultraviolet radiation.

2. The decorative film according to claim 1, further comprising:
a release layer formed between the base film and the ink-absorbing layer; and
a protective layer formed between the release layer and the ink-absorbing layer.

3. The decorative film according to claim 1, wherein the part of the ink penetrates into the ink-absorbing layer in such a manner that each droplet of the ink has a shape tapering into the ink-absorbing layer from a surface of the ink-absorbing layer.

4. The decorative film according to claim 1, wherein the ink-absorbing layer is partially exposed from the colored layer,
wherein the decorative film further comprises an adhesive layer coating both the colored layer and exposed portions of the ink-absorbing layer.

5. The decorative film according to claim 1, wherein the filler contains photo-semiconductor material.

6. The decorative film according to claim 1, wherein the filler contains conductive material.

7. The decorative film according to claim 1, wherein the filler is composed of porous particles or contains voids.

8. A molded product comprising:
a body; and
a transfer portion formed on a surface of the body and including an ink-absorbing layer and a colored layer,
wherein the colored layer is a cured product of ultraviolet curable ink,
the ink-absorbing layer contains filler made of photorefractive material and is provided with voids therein,
the filler reflects and scatters an ultraviolet radiation applied from above the colored layer, and
a part of the ink penetrates into the ink-absorbing layer and is cured in the ink-absorbing layer by the reflected and scattered ultraviolet radiation.

9. The molded product according to claim 8, wherein the part of the ink penetrates into the ink-absorbing layer in such a manner that each droplet of the ink has a shape tapering into the ink-absorbing layer from a surface of the ink-absorbing layer.

10. The molded product according to claim 8, wherein the surface of the body is formed of a resin layer.

11. The molded product according to claim 8, wherein the filler is composed of porous particles or contains voids.

* * * * *